Dec. 27, 1966   P. GIANARIS   3,293,962
CORRUGATED BOARD CUTTER DEVICE AND PROCESS
Filed Jan. 7, 1965   3 Sheets-Sheet 1
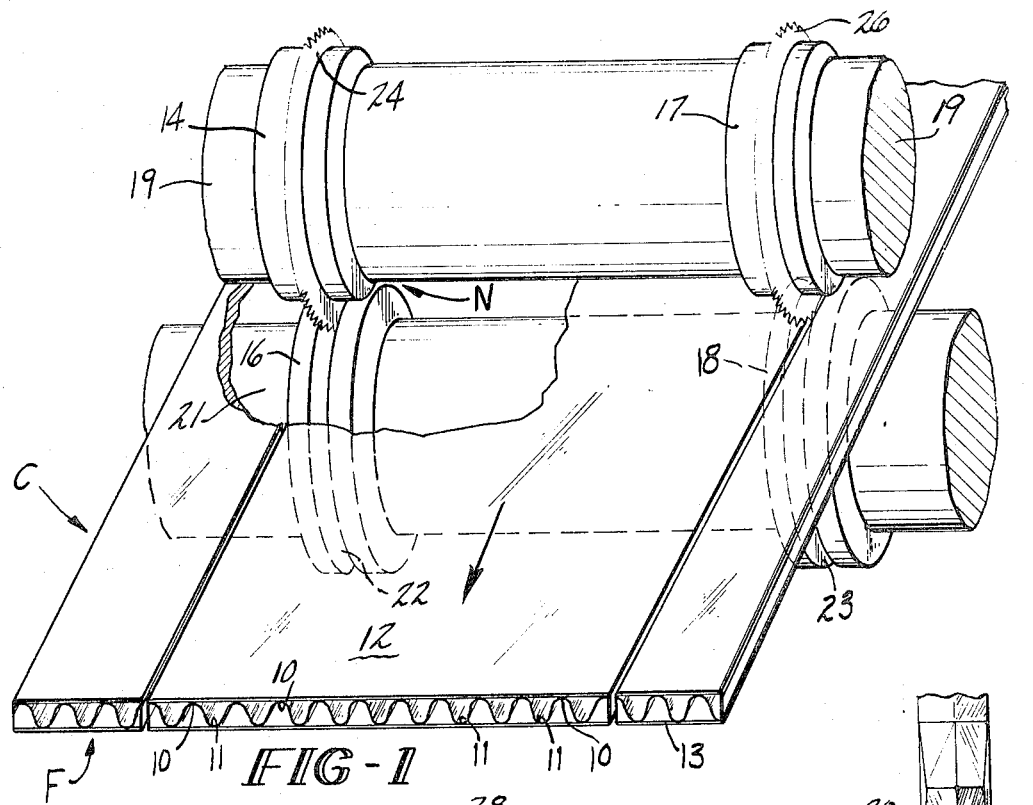
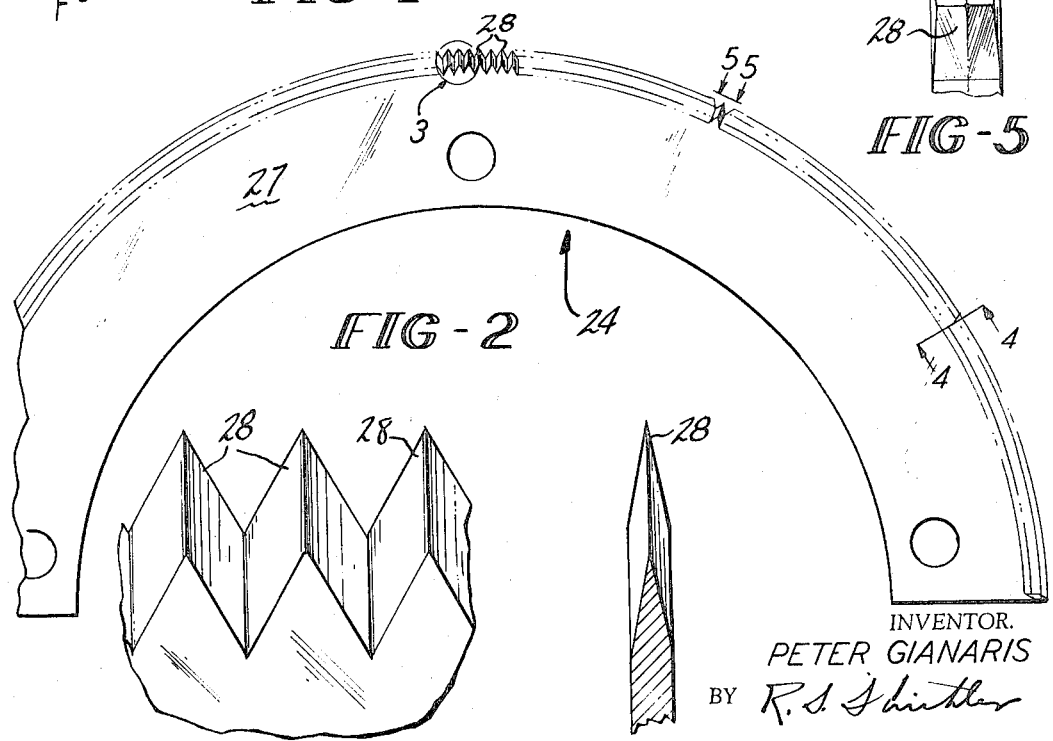
INVENTOR.
PETER GIANARIS
BY R. S. Shindler
ATTORNEY Dec. 27, 1966  P. GIANARIS  3,293,962
CORRUGATED BOARD CUTTER DEVICE AND PROCESS
Filed Jan. 7, 1965  3 Sheets-Sheet 2

INVENTOR.
PETER GIANARIS
BY R. J. Strickler
ATTORNEY

Dec. 27, 1966  P. GIANARIS  3,293,962
CORRUGATED BOARD CUTTER DEVICE AND PROCESS
Filed Jan. 7, 1965  3 Sheets-Sheet 3
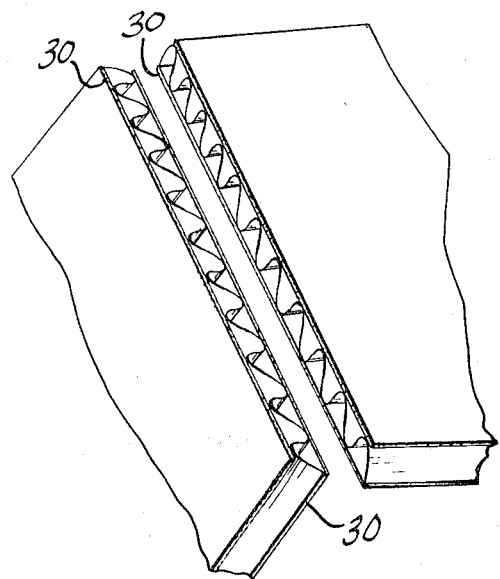
FIG-8
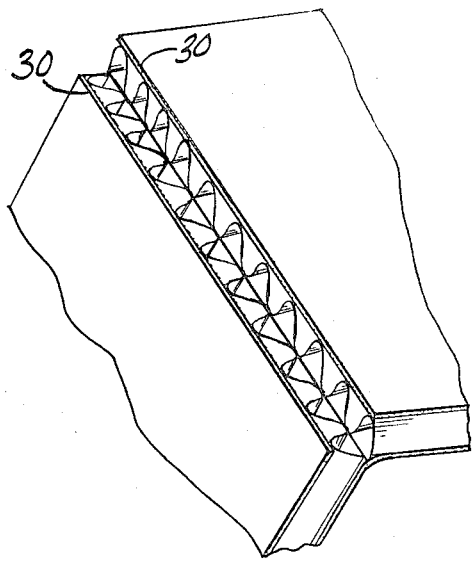
FIG-9
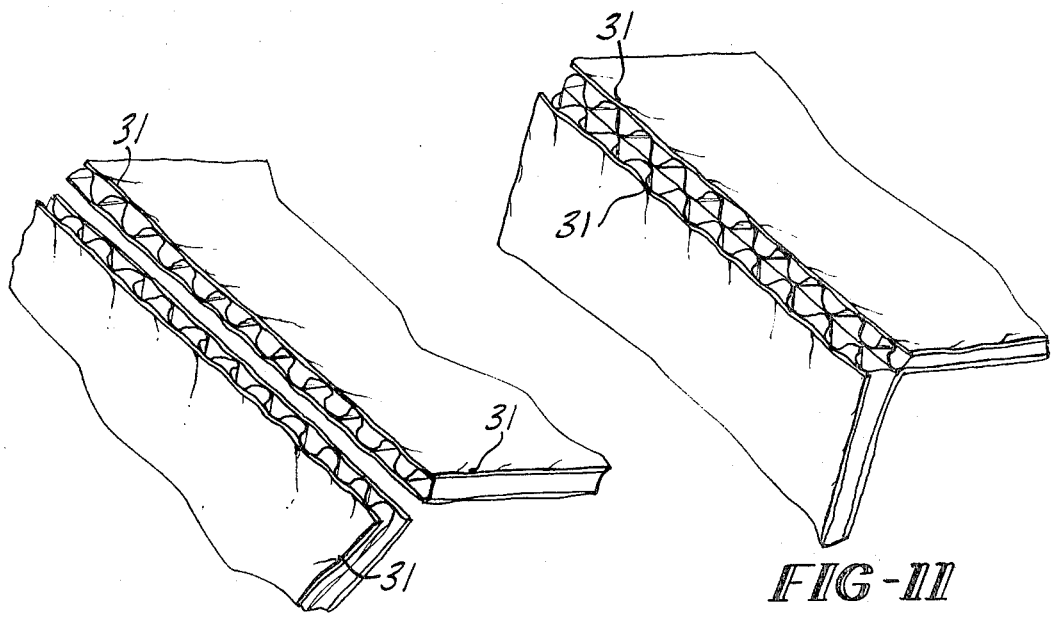
FIG-10
FIG-11
INVENTOR.
PETER GIANARIS
BY
ATTORNEY

United States Patent Office 3,293,962
Patented Dec. 27, 1966

3,293,962
CORRUGATED BOARD CUTTER DEVICE AND PROCESS
Peter Gianaris, West Monroe, La., assignor to Olin Mathieson Chemical Corporation, a corporation of Virginia
Filed Jan. 7, 1965, Ser. No. 424,097
1 Claim. (Cl. 83—470)

The present invention relates to cutting and slitting paperboard, particularly corrugated board.

The invention deals with an apparatus and a process for cutting corrugated board by means of a sawing and shearing action to avoid crushing the board as frequently occurs in prior art cutters and processes.

A particular feature of the invention is the provision of a cutting device and a cutting process which permits cutting corrugated board without crushing the board at the point of cutting.

The present invention contemplates cutting along lines which are parallel, normal or skew relative to the lands and grooves of the corrugated medium of the board.

A still further feature of the invention is the provision of a novel circular saw-toothed cutter.

A further feature of the invention is the provision of a cutting device and process which does not develop feeding or guiding problems in the board stock being cut.

Stated differently, the practice of the process of the present invention and the operation of the apparatus thereof does not cause shifting of the board stock transversely of the cutters or in any other undesirable direction.

In prior art cutting devices and processes for cutting and slitting corrugated board there is frequently a tendency for the cutter, particularly when it is cut along a line generally parallel to the lands and grooves of the corrugation, to drive the board sideways or transversely, thus developing dimension problems in the finished board.

Therefore, it is a further feature of the present invention to provide a cutting device and a cutting process which produces board cut within very close tolerances.

Correspondingly, board cut in accordance with the present invention is not mutilated along its side edges because there is no lateral pressure between the side edges of the boards and the side guides.

A still further feature of the present invention is the provision of cut corrugated board having a scalloped or finely notched edge which is free of the hazard of sharp knife-like edges and margins.

A process embracing certain principles of the present invention and operative to cut or slit paperboard such as corrugated kraft board without crushing the board in the region of the cut and without impeding the advance or the discharge of the board to and from a cutting station may comprise the steps of providing at least one pair of rotatable anvils, spacing the anvils to provide a nip having a gap at least as wide as the thickness of the board, advancing the board through the nip and sawing and shearing the board at the nip with a serrated or toothed saw.

A circular saw-toothed cutter embracing certain principles of the present invention may comprise a ring having a plurality of circumferentially spaced cutting elements, said cutting elements defining a pyramid.

An apparatus for cutting or slitting paperboard such as corrugated kraft board without crushing the board in the region of the cut and without impeding the advance or the discharge of the board to and from a cutting station may comprise at least one pair of rotatably mounted anvils, said anvils being spaced to form a nip defining a gap between the anvils, said gap being at least as wide as the thickness of the board, one anvil being fitted with a circular saw-toothed cutter and the other anvil being formed with a circular undercut operative to provide clearance for said cutter whereby corrugated board advanced through the nip is cut by a sawing and shearing action and said board is free of any tendency to drive the board laterally.

Other features and advantages of the present invention will become more apparent from an examination of the succeeding specification when read in conjunction with the appended drawings, in which:

FIG. 1 is a perspective view of a typical cutting apparatus embracing the principles of the present invention;

FIG. 2 is an elevational view of one-half of a toothed cutter;

FIG. 3 is an enlarged view of the cutter teeth of FIG. 2;

FIG. 4 is a sectional view of FIG. 2 as viewed in the plane of line 4—4 and in the direction of the arrows;

FIG. 5 is a plane view of the cutter teeth as viewed in the plane of the line 5—5 of FIG. 2;

FIG. 8 shows a transverse and a parallel through cut in a corrugated board;

FIG. 9 shows a partial transverse cut;

FIGS. 10 and 11 are illustrations of the crushing action and the sharp knife edges developed in the board by prior art cutting devices.

Figure 6:
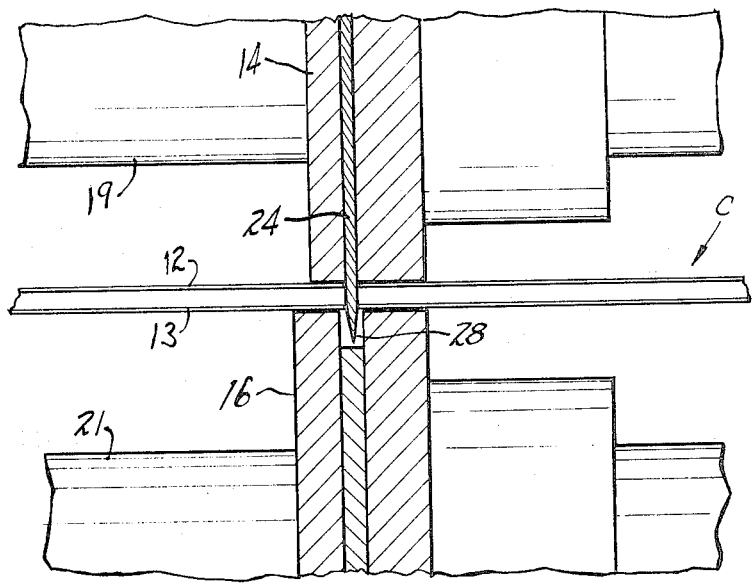
FIG. 6 is an enlarged view of a portion of FIG. 1 illustrating the disposition of the cutters while effecting a full through cut.

Referring now to the drawings, and in particular FIG. 1, there is shown a typical cutting apparatus whose structure and operation represent an exemplary embodiment of the present invention.

The letter C designates a sheet of corrugated board having flutes F comprising lands 10 and grooves 11 with top sheet 12 and a bottom sheet 13.

The board C is shown advancing in the direction indicated by the arrow between two pairs of anvils 14–16 and 17–18 mounted upon rotatable shafts 19 and 21.

The shafts 19 and 21 are so spaced from one another to provide a nip or opening N between anvils 14 and 16 on the left, and anvils 17 and 18 on the right, whose gap or clearance is sufficient to receive board C without crushing the lands and grooves of the corrugation in the region of the cut.

Note that lower anvils 16 and 18 are each provided with a recess or undercut 22 and 23 to provide clearance for circular toothed cutters 24 and 26.

It should be noted that the top and bottom shafts and anvils do not have to be the same diameter or circumference to achieve the desired results of this invention. It is also to be noted that the female anvil need not be driven to achieve the desired results of this invention.

Circular cutter 24 (and circular cutter 26), bolted to the upper anvils 14 and 17, respectively, is made in two semi-circular sections 27; one section of cutter 24 is shown in FIG. 2.

Referring now to FIGS. 2 through 5, note that the cutter section 27 is formed with a plurality of cutting elements or teeth 28—28 each defining a pyramid.

Figure 7:
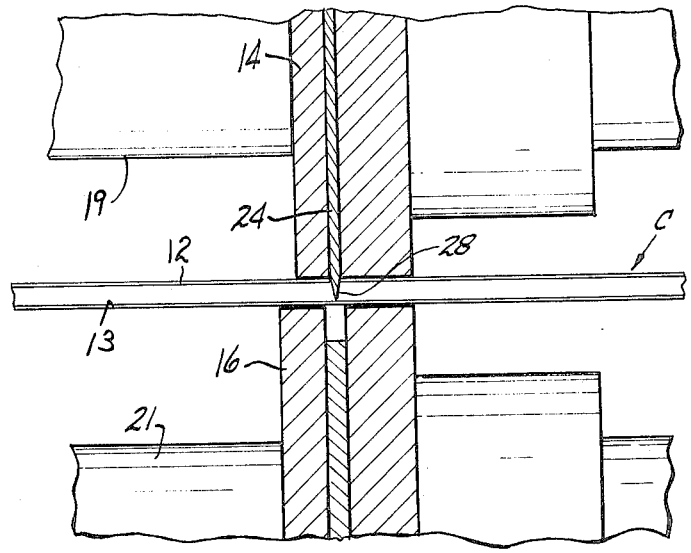
FIG. 7 is a view similar to FIG. 6 showing the disposition of the cutter during a partial cut.

As the cutters 24 and 26 rotate, the teeth 28—28 effect a sawing and shearing action upon the board as it is advanced through the nip of the anvils to cut the board with a through cut as shown in FIG. 6 or with a partial cut as shown in FIG. 7, depending upon the extent to which the cutter projects from the upper anvil.

As shown in FIGS. 8 and 9, the cutter 24 effects a notched or serrated edge represented by the reference numeral 30.

Note further that the corrugated board is not crushed along the cut margin, even if cut parallel to the flutes of the corrugations.

In contrast, FIGS. 10 and 11 show the effect of prior art cutting devices and processes wherein the margins of the board immediately adjacent the cut are crushed or otherwise depressed as indicated at the points designated by the reference numerals 31—31.

In addition, prior art cutting devices developed a sharp edge which develops a hazardous condition among personnel handling board following the slitting or cutting operation.

It is anticipated that a wide variety of embodiments of the present invention may be devised without departing from the spirit and scope thereof.

What is claimed is:

An apparatus for cutting or slitting paperboard such as corrugated kraft board without crushing the board and without impeding the advance or the discharge of the board to and from the cutting station comprising at least one pair of rotatably mounted anvils, said anvils being spaced to form a nip defining a gap between said anvils, said gap being at least as wide as the thickness of said board, one anvil being fitted with a circular saw-toothed cutter, the other anvil having a circular undercut in alignment with said cutter providing clearance for said cutter, and said cutter having a plurality of circumferentially spaced cutting elements projecting from said cutter, each element defining a pyramid.

References Cited by the Examiner

UNITED STATES PATENTS

| 1,123,885 | 1/1915 | Jones et al. | 93—58.2 |
| 1,837,235 | 12/1931 | Schroeder et al. | 193—58.2 |
| 2,164,436 | 7/1939 | Waters | 93—58.2 |
| 3,053,154 | 9/1962 | Palamenti | 93—58.2 |
| 3,119,312 | 1/1964 | Henc | 93—58.2 |

FOREIGN PATENTS

| 646,227 | 8/1962 | Canada. |

ANDREW R. JUHASZ, *Primary Examiner.*

J. M. MEISTER, WILLIAM W. DYER, JR.,
*Assistant Examiners.*